(12) United States Patent
Nagashima

(10) Patent No.: US 6,548,434 B2
(45) Date of Patent: Apr. 15, 2003

(54) PALELY COLORED GLASS HAVING HIGH TRANSMITTANCE AND METHOD FOR PRODUCING THE SAME

(75) Inventor: Yukihito Nagashima, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 55 days.

(21) Appl. No.: 09/980,457

(22) PCT Filed: Mar. 2, 2001

(86) PCT No.: PCT/JP01/01609

§ 371 (c)(1),
(2), (4) Date: Nov. 1, 2001

(87) PCT Pub. No.: WO01/64595

PCT Pub. Date: Sep. 7, 2001

(65) Prior Publication Data

US 2002/0169064 A1 Nov. 14, 2002

(30) Foreign Application Priority Data

Mar. 2, 2000 (JP) ........................................ 2000-057104
Dec. 28, 2000 (JP) ........................................ 2000-401952

(51) Int. Cl.$^7$ .............................................. C03C 3/087
(52) U.S. Cl. .............................. 501/70; 501/64; 501/71
(58) Field of Search ................ 501/64, 70, 71

(56) References Cited

U.S. PATENT DOCUMENTS

| | | | |
|---|---|---|---|
| 2,669,808 A | * | 2/1954 | Duncan et al. .............. 428/433 |
| 5,030,593 A | | 7/1991 | Heithoff |
| 5,030,594 A | | 7/1991 | Heithoff |
| 5,069,826 A | * | 12/1991 | Cheng ........................ 252/587 |
| 5,346,768 A | * | 9/1994 | Winter et al. ............. 428/411.1 |
| RE34,760 E | * | 10/1994 | Boulos et al. ................. 501/71 |
| 5,558,942 A | * | 9/1996 | Itoh et al. ................ 428/411.1 |
| 5,656,559 A | | 8/1997 | Combes et al. |
| 5,674,791 A | * | 10/1997 | Amundson, Jr. ............. 501/70 |
| 5,747,398 A | * | 5/1998 | Higby et al. ................... 501/66 |
| 6,218,323 B1 | | 4/2001 | Bretschneider et al. |
| 6,407,021 B1 | * | 6/2002 | Kitayama et al. ............. 501/70 |
| 2001/0021685 A1 | * | 9/2001 | Sakaguchi et al. ............ 501/64 |

FOREIGN PATENT DOCUMENTS

| | | |
|---|---|---|
| JP | 4-228450 | 8/1992 |
| JP | 4-228451 | 8/1992 |
| JP | 8-40742 | 2/1996 |
| JP | 10-45424 | 2/1998 |

\* cited by examiner

*Primary Examiner*—David Sample
(74) *Attorney, Agent, or Firm*—Merchant & Gould P.C.

(57) ABSTRACT

The present invention provides a light-colored high-transmittance glass sheet including, as coloring components, in weight percent, less than 0.06% total iron oxide in terms of $Fe_2O_3$ (T—$Fe_2O_3$); 0.5 to 5 ppm CoO; and 0 to 0.45% cerium oxide; wherein the ratio of FeO in terms of $Fe_2O_3$ to T—$Fe_2O_3$ is less than 40%; and wherein the glass sheet has a dominant wavelength of 470 to 495 nm when measured at a glass sheet thickness of 10 mm. The present invention also provides a light-colored high-transmittance glass sheet of light neutral gray or bronze tint with a dominant wavelength of 560 to 585 nm.

28 Claims, No Drawings

PALELY COLORED GLASS HAVING HIGH TRANSMITTANCE AND METHOD FOR PRODUCING THE SAME

TECHNICAL FIELD

The present invention relates to a light-colored high-transmittance glass having a light blue, neutral gray or bronze tint and high transmittance, that is suitable as a building glass or interior glass, and to a method for manufacturing such a glass at low cost.

BACKGROUND ART

Recently, so-called crystal clear glass that is substantially colorless has been favored for exterior or interior use in buildings. But there are also cases in which light blue, gray or bronze glass is preferred in order to provide balance with the tints of the surrounding interior and exterior.

For this purpose, glass of light color and high transmittance is used, which is obtained by using raw materials of high purity, in which the iron content has been reduced considerably compared to that in regular soda-lime-based glass composition, or by adding small amounts of coloring agents to the glass.

For example, the edge colored (high transmittance) glass disclosed in JP H04-228450A is a soda-lime glass containing (in weight percent) less than 0.02% total iron oxide in terms of $Fe_2O_3$ as a coloring agent, and the ratio of the ferrous iron (FeO) to the total iron oxide is at least 0.4, whereby a luminous transmittance (when measured with the CIE Standard illuminant C) of at least 87% is attained at a thickness of 5.66 mm, yielding a glass with slight color and high transmittance.

This glass composition is characterized in that, in order to attain the above properties, it has a small $SO_3$ content, a manufacturing method is used in which the melting includes separate liquefying and refining steps, and a batch material is used that does not contain limestone or dolomite, so as to lower the iron content in the glass.

In the edge-colored high transmittance glass disclosed in JP H04-228451A, trace amounts of Se and CoO are added to a glass composition containing about the same amount of iron oxide, so as to obtain a glass sheet with a dominant wavelength in transmission of 570 to 590 nm, in which the edge color (of the glass) harmonizes with wood colors.

On the other hand, methods have been proposed, in which the coloring of soda-lime glass containing a normal amount of iron oxide impurities is reduced by changing the basic composition of the glass.

For example, in accordance with the transparent glass composition for manufacturing window glass disclosed in JP H08-40742A, a soda-lime-silica glass in which the total amount of iron oxide in terms of ferric oxide accounts for 0.02 to 0.2 wt % includes as a basic composition, in weight percent, 69 to 75% $SiO_2$, 0 to 3% $Al_2O$, 0 to 5% $B_2O_2$, 2 to 10% CaO, less than 2% MgO, 9 to 17% $Na_2O$, 0 to 8% $K_2O$, arbitrary amounts of fluorine, zinc oxide, zirconium oxide, less than 4 wt % of barium oxide and not more than 10 wt % of the alkaline earth metal oxides. According to this composition, the FeO absorption band can be shifted to longer wavelengths, or the gradient of the FeO absorption band at the edge of the visible spectrum near infrared can be made steeper. This makes it possible to manufacture a window glass with superior infrared absorption and with less coloring than soda-lime-silica glasses having a normal basic composition.

However, in the edge-colored high transmittance glasses disclosed in JP H04-228450A and JP H04-228451A, it is a precondition that limestone and dolomite, which contain relatively large amounts of iron oxide impurities, cannot be used, so as to control the total iron oxide in terms of $Fe_2O_3$ included as the coloring agent to less than 0.02 wt %. Therefore, it is necessary to use special raw materials such as calcium carbonate minerals or hydrated aluminum containing less iron oxide, which makes the resulting glass more expensive.

In the edge-colored high transmittance glass disclosed in JP H04-228450A, to obtain a desired pure bright azure edge color, it is necessary to make the ratio of ferrous iron (FeO) to the total iron oxide at least 0.4.

Therefore, it is desirable to apply a special manufacturing method, in which the method includes separate melting and refining steps, and to suppress the $SO_3$ content to a low level, which makes the resulting glass more expensive.

If, in the glasses disclosed in these publications, the raw materials for the glass contain Ni ions as impurities, then the Ni ions tend to bond with sulfide ions, forming NiS, which could cause spontaneous breakage. This is because the amount of Fe ions, which bond more easily with sulfide ions than Ni ions, is suppressed so as to attain a light tint.

In the transparent glass composition for manufacturing window glass disclosed in JP H08-40742A, the transmittance of soda-lime glass containing a normal amount of iron oxide is increased by changing the basic composition of the glass.

However, the effect of the method disclosed in this publication, that is, the degree that the FeO absorption is shifted to longer wavelengths, is insufficient for building or interior glass, for which a light tint is desired.

Moreover, in the composition disclosed in this publication, the amounts of MgO and MgO+CaO are less, and to compensate the adverse effect this has on the melting, the amount of $Na_2O$ is increased to more than the normal amount, so that this composition is not suitable for mass production due to the high liquidus temperature and the high costs.

The effect disclosed in this publication can be enhanced by adding such components as F or BaO, but adding these components is not desirable, as it increases the costs, and the volatility of the F shortens the furnace lifetime and leads to emission of hazardous substances into the atmosphere.

DISCLOSURE OF THE INVENTION

In view of the problems of the related art, it is an object of the present invention to provide a light-colored high-transmittance glass, in particular a glass having high transmittance and a tint of light blue, neutral gray or bronze that is suitable as building glass or interior glass, as well as a method for manufacturing such a glass at low cost.

According to one aspect of the present invention, a light-colored high-transmittance glass sheet containing silica as a main component is characterized in that the glass sheet includes, as coloring components, in weight percent:

less than 0.06% total iron oxide (referred to as "T—$Fe_2O_3$" in the following) in terms of $Fe_2O_3$;

0.5 to 5 ppm CoO;

0 to 0.45% cerium oxide;

wherein the ratio of FeO in terms of $Fe_2O_3$ to T—$Fe_2O_3$ (referred to as "FeO ratio" in the following) is less than 40%; and wherein the glass has a light blue tint with a dominant wavelength of 470 to 495 nm when measured with the CIE Standard illuminant C at a glass sheet thickness of 10 mm.

It is preferable that the light-colored high-transmittance glass sheet with light blue tint in accordance with the present invention includes, in weight percent, less than 2 ppm CoO and at least 0.02% T—Fe$_2$O$_3$.

It is preferable that the dominant wavelength of a light-colored high-transmittance glass sheet with light blue tint in accordance with the present invention is 480 to 490 nm.

According to another aspect of the present invention, a light-colored high-transmittance glass sheet containing silica as a main component is characterized in that the glass sheet includes, as coloring components, in weight percent:

at least 0.02% and less than 0.06% T—Fe$_2$O$_3$;

0.25 to 3 ppm Se;

0 to 3 ppm CoO;

0 to 0.45% cerium oxide;

wherein the FeO ratio is less than 40%; and wherein the glass has a light neutral gray or bronze tint with a dominant wavelength of 560 to 585 nm when measured with the CIE Standard illuminant C at a glass sheet thickness of 10 mm.

It is preferable that the light-colored high-transmittance glass sheet with light neutral gray or bronze tint in accordance with the present invention includes, in weight percent, 0.5 to 2 ppm Se, and 0.5 to 1 ppm CoO.

It is preferable that the dominant wavelength of a light-colored high-transmittance glass sheet with light neutral gray and bronze tint in accordance with the present invention is 565 to 580 nm.

It is preferable that in the light-colored high-transmittance glass sheet with a light neutral gray tint of the present invention, at a thickness of 10 mm, the chromaticities a* and b* in the L*a*b* color system measured with the CIE Standard illuminant C are $-1 \leq a^* \leq 0.5$ and $-0.5 \leq b^* \leq 1.5$.

In the above aspects of the present invention, it is preferable that the content of cerium oxide, expressed in weight percent, is less than 0.1%.

In the light-colored high-transmittance glasses with the aforementioned preferable coloring agent compositions and tints, it is preferable that the basic glass comprises, in weight percent:

65 to 80% SiO$_2$;

0 to 5% Al$_2$O$_3$;

more than 2% MgO;

5 to 15% CaO;

10 to 18% Na$_2$O;

0 to 5% K$_2$O;

5 to 15% MgO+CaO;

10 to 20% Na$_2$O+K$_2$O; and 0.05 to 0.25% SO$_3$.

It is more preferable that it comprises, in weight percent, more than 10% MgO+CaO; and more than 0.1% SO$_3$.

It is preferable that the glass is substantially free of fluorine, barium oxide and strontium oxide.

In the present invention, if Ni ion impurities are contained in the raw material by reducing the Fe ions, then the Ni ions tend to bond with the sulfide ions, forming NiS, which could cause spontaneous breakage. This is because Fe ions are reduced, which bond more easily with sulfide ions than Ni ions, so as to attain a light tint.

This tendency can be countered by adding in the composition an oxide of a heavy element, such as Y, La, Zr, Hf, Nb, Ta, W, Zn, Ga, Ge and Sn, alone or in combination. These heavy element oxides do not color the glass, and have no harmful effect on the glass, even when it is exposed to a reducing atmosphere in the float bath.

It is preferable that the amount of heavy element oxide included alone or in combination is, in weight %, 0.001 to 1%, more preferably 0.01 to 0.1%, and most preferably 0.01 to 0.05%. Preferable heavy element oxides include ZnO.

When manufacturing the light-colored high-transmittance glass of the present invention, it is preferable to use dolomite and limestone as raw materials, as for normal soda-lime glass, because this minimizes cost increases for the glass sheet. This becomes possible by setting the iron oxide content within the above-noted preferable ranges.

In order to minimize cost increases for the glass in this melting method, as above, it is preferable that the batch material is melted in a top-heating tank-type furnace, in which the melting step and the refining step can be performed in one tank, which is routinely used for soda-lime glass melting furnaces.

The following is an explanation of the reasons for the composition limitations of the light-colored high-transmittance glass of the present invention. The following compositions are given in weight percent.

In a glass composition, iron oxide is present in form of Fe$_2$O$_3$ and FeO. The Fe$_2$O$_3$ component adds a very light yellow tint to the glass, while the FeO component adds a blue tint to the glass.

In order to obtain the desired light tint and high transmittance, the T—Fe$_2$O$_3$ has to be less than 0.06% and the FeO ratio has to be in a range less than 40%. If the T—Fe$_2$O$_3$ is not less than 0.06%, then the green coloring caused by the included iron oxide becomes too dark, and it becomes difficult to attain the desired tint. A preferable upper limit for the T—Fe$_2$O$_3$ is 0.04%, at which the green color is not very perceptible and a high transmittance is obtained. If the FeO ratio is not less than 40%, then the melting in a regular melting furnace for soda-lime glass becomes difficult.

If the T—Fe$_2$O$_3$ is less than 0.02%, then it is necessary to use high-purity raw materials with little iron content, which increases the costs considerably, so that it is preferable that the amount of T—Fe$_2$O$_3$ is at least 0.02%.

In order to attain a blue tint, CoO is an essential component. If less than 0.5 ppm are included, then the green tint of the iron oxide is conspicuous, and if more than 5 ppm are included, then the blue is too strong. A more preferable range is not more than 2 ppm.

In order to attain a neutral gray or bronze tint, Se is an essential component while CoO is an arbitrary component. To attain a neutral gray or bronze tint, it is very important to balance the green color of the iron oxide, the reddish brown color of the Se, and the blue color of the CoO. If the Se is less than 0.25 ppm, then the tint takes on a somewhat greenish color, and if the Se is more than 3 ppm, then the reddish brown color becomes too strong and conspicuous. If the CoO is more than 3 ppm, then the blue color becomes too strong and conspicuous, and it becomes difficult to attain a neutral gray or bronze tint. In order to attain a neutral gray or bronze tint while keeping the transmittance high, it is preferable that the Se is in the range of 0.5 to 2 ppm and CoO is in the range of 0.5 to 1 ppm.

The cerium oxide is not essential but advantageous for reducing the green color by oxidizing FeO to Fe$_2$O$_3$, and also has the additional advantageous effect of decreasing the UV ray transmittance of the glass sheet. These effects increase as more cerium oxide is included, but when the upper limit of 0.45% is exceeded, its yellow color becomes conspicuous, and it becomes difficult to attain the desired tint. Furthermore, since it is an expensive material increasing the costs of the glass, it is preferable to add less than 0.1%.

$SiO_2$ is the main component to form the glass network. If the $SiO_2$ is less than 65%, then the durability of the glass decreases, and if it exceeds 80%, it becomes difficult to melt the glass.

$Al_2O_3$ is a component that improves the durability of the glass. However, when more than 5% $Al_2O_3$ is included, it becomes difficult to melt the glass. Preferably, $Al_2O_3$ is included in the range of 0.1 to 2.5%.

MgO and CaO improve the durability of the glass, and also are used to adjust the liquidus temperature and viscosity during the forming. If not more than 2% MgO is included, the liquidus temperature increases. If less than 5% or more than 15% CaO is included, the liquidus temperature increases. If the total amount of MgO and CaO is less than 5%, the durability of the glass decreases, and if the total amount exceeds 15%, the liquidus temperature increases. If the total amount of MgO and CaO is small, for example not more than 10%, then it is necessary to increase the amount of $Na_2O$ to compensate for the deterioration of the melting properties and the increase of the viscosity of the glass melt, which leads to cost increases and to a decrease in the chemical durability of the glass. Thus, it is preferable that the total amount of MgO and CaO is more than 10%.

The components $Na_2O$ and $K_2O$ work as melting accelerators. If less than 10% $Na_2O$ is included or if the total amount of $Na_2O$ and $K_2O$ is less than 10%, then the effect of melt acceleration is poor. If $Na_2O$ exceeds 18% or the total amount of $Na_2O$ and $K_2O$ exceeds 20%, then the durability of the glass decreases. Since $K_2O$ is more expensive than $Na_2O$, it is preferable that the included amount of $K_2O$ does not exceed 5%.

$SO_3$ is a component that enhances the refining of the glass. If less than 0.05% $SO_3$ is included, a sufficient refining effect cannot be attained with the usual melting methods. A preferable range for $SO_3$ is at least 0.1%. On the other hand, if more than 0.25% is included, the $SO_2$ generated from decomposition of $SO_3$ may remain in the glass as bubbles and bubbles tend to be generated by reboiling.

$TiO_2$ is not an essential component, but it can be added to improve the UV ray absorption, in a suitable amount within a range that does not damage the optical properties of the object of the present invention. If too much $TiO_2$ is added, the glass takes on a yellowish color, so that it is preferable to set the included $TiO_2$ in a range of not more than 0.2%.

Furthermore, the effect of the present invention is not harmed by including fluorine, barium oxide or strontium oxide. However, these components have undesirable influences with regard to cost increases, furnace lifetime, and emission of hazardous substances into the atmosphere, so that it is preferable that the glass is substantially free of these components.

For the component to be added as an oxidizing agent to the glass with a composition in the above-described ranges, cerium oxide in the above-defined range is preferable in view of its additional preferable effect of UV ray absorption. However, it is also possible to add other oxidizing agents, such as manganese oxide, in a range of not more than 1%, alone or in combination with the cerium oxide.

The oxide of a heavy element, such as Y, La, Zr, Hf, Nb, Ta, W, Zn, Ga, Ge and Sn, is a component that does not have to be added in particular if the glass is used without tempering, but if the glass is used as a tempered glass that is reinforced by rapidly air-cooling, then it is preferable to add 0.001 to 1% of this component, alone or in combination of a plurality of these heavy element oxides, so as to prevent spontaneous breakage due to the NiS. At less than 0.001%, the effect of preventing the generation of NiS is weak, and at not less than 1%, the costs for the raw materials become high and the glass tends to be devitrified. A more preferable addition range is 0.01 to 0.1%, and a most preferable addition range is 0.01 to 0.05%. Furthermore, all of the above-mentioned heavy element oxides have more or less the same effect of preventing the generation of NiS, but ZnO is most preferable in view of its effect and costs. Moreover, as the raw material for these heavy element oxides, it is also possible to use non-oxide materials such as sulfates or nitrates if the materials turn into an oxide during the melting of the glass.

Moreover, it is also possible to add for example at least one of $Cr_2O_3$, NiO, $V_2O_5$ and $MoO_3$ as a regular coloring agent within a range that does not harm the light tint that is an object of the present invention. However, since the addition of such coloring agents strengthens the color tone and darkens the glass, it is preferable that the glass is substantially free from such coloring agents.

EMBODIMENTS OF THE INVENTION

The following is an explanation of the preferred embodiments of the present invention, with reference to specific examples.

EXAMPLES 1 to 5

The raw materials for the composition shown in Table 1 (in weight percent in terms of the oxides) were mixed using low-iron silica, limestone, dolomite, soda ash, saltcake, cerium oxide, CoO, metallic selenium and a carbonaceous reducing agent, and the batch material was heated to 1450° C. in an electric furnace and melted. After four hours of melting, the glass material was poured onto a stainless steel plate, annealed to room temperature, and a glass sheet of about 15 mm thickness was obtained. The concentrations in the table are given in weight percent, whereas only CoO and Se are given in ppm.

Then, the glass sheet was ground and polished to a thickness of 10 mm, and for the optical properties, visible light transmittance, dominant wavelength, excitation purity, chromaticities a* and b* under the L*a*b* color system were measured with the CIE Standard illuminant C, and solar radiation transmittance, and UV ray transmittance according to ISO 9050 were measured. Table 1 shows the optical properties of the resulting samples.

TABLE 1

|  | Ex. 1 | Ex. 2 | Ex. 3 | Ex. 4 | Ex. 5 |
| --- | --- | --- | --- | --- | --- |
| $SiO_2$ | 72.1 | 71.2 | 71.7 | 71.2 | 7.12 |
| $Al_2O_3$ | 1.74 | 1.66 | 1.68 | 1.75 | 1.66 |
| MgO | 4.2 | 4.2 | 4.4 | 4.2 | 4.2 |
| CaO | 8.5 | 8.5 | 8.8 | 8.5 | 8.5 |
| $Na_2O$ | 13.0 | 13.5 | 12.5 | 13.1 | 13.5 |
| $K_2O$ | 0.7 | 0.7 | 0.7 | 1.0 | 0.7 |
| $SO_3$ | 0.12 | 0.20 | 0.15 | 0.18 | 0.20 |
| T-$Fe_2O_3$ | 0.018 | 0.025 | 0.025 | 0.030 | 0.036 |
| $TiO_2$ | 0.02 | 0.02 | 0.04 | 0.04 | 0.02 |
| cerium oxide | 0 | 0 | 0.08 | 0 | 0 |
| CoO | 0.5 | 1 | 1.75 | 1 | 1 |

TABLE 1-continued

|  | Ex. 1 | Ex. 2 | Ex. 3 | Ex. 4 | Ex. 5 |
|---|---|---|---|---|---|
| Se | 0 | 0 | 0 | 0.75 | 2 |
| FeO | 0.006 | 0.007 | 0.003 | 0.008 | 0.009 |
| FeO ratio | 37 | 31 | 13 | 30 | 28 |
| visible light transmittance (%) | 90.4 | 88.9 | 91.0 | 87.8 | 85.9 |
| solar radiation transm. (%) | 88.4 | 84.8 | 90.5 | 84.0 | 83.8 |
| UV ray transmittance (%) | 67.6 | 63.8 | 36.7 | 55.2 | 53.8 |
| dominant wavelength (nm) | 488 | 485 | 480 | 570 | 577 |
| excitation purity (%) | 0.39 | 1.03 | 1.85 | 1.40 | 2.06 |
| a* | — | — | — | −0.60 | −0.10 |
| b* | — | — | — | 1.05 | 2.12 |

As becomes clear from Table 1, in the samples of the Examples 1 to 3, the glass has a clear light blue tint, as can be seen from the dominant wavelength, which is in the range of 480 to 490 nm. In Example 4, the glass has an approximately neutral gray color, as can be seen from the chromaticities a* and b*. In Example 5, the glass has a light bronze tint, as can be seen from the dominant wavelength and the chromaticities a* and b*.

COMPARATIVE EXAMPLES 1 to 3

Table 2 lists the composition and optical properties of the comparative examples contrasted with the present invention. The compositions are given in weight percent.

TABLE 2

|  | Comp. Ex. 1 | Comp Ex. 2 | Comp. Ex. 3 |
|---|---|---|---|
| SiO$_2$ | 71.7 | 71.2 | 71.7 |
| Al$_2$O$_3$ | 1.70 | 1.66 | 1.68 |
| MgO | 4.2 | 4.2 | 4.3 |
| CaO | 8.5 | 8.5 | 8.8 |
| Na$_2$O | 13.0 | 13.5 | 12.5 |
| K$_2$O | 0.7 | 0.7 | 0.7 |
| SO$_3$ | 0.16 | 0.20 | 0.20 |
| T-Fe$_2$O$_3$ | 0.018 | 0.025 | 0.080 |
| TiO$_2$ | 0.02 | 0.02 | 0.04 |
| FeO | 0.006 | 0.008 | 0.020 |
| FeO ratio | 37 | 36 | 28 |
| visible light transmittance (%) | 90.6 | 90.3 | 86.0 |
| solar radiation transm. (%) | 88.6 | 86.8 | 75.4 |
| UV ray transmittance (%) | 67.2 | 65.1 | 48.3 |
| dominant wavelength (nm) | 538 | 498 | 503 |
| excitation purity (%) | 0.36 | 0.53 | 1.01 |
| a* | — | — | −2.31 |
| b* | — | — | 0.23 |

Comparative Examples 1 and 2 have the same basic composition of the present invention and include total iron oxide and a FeO ratio within the prescribed limit, but do not include Se or CoO. Comparative Example 3 is a typical soda-lime glass composition.

As can be seen from the fact that in all of these compositions the dominant wavelength is in the range of 498 to 538 nm, these compositions yield colors ranging from bluish green to yellowish green, which is different from the blue, neutral gray or bronze that is the intended object of the present invention. Comparative Examples 1 and 2 have a light tint, and their transmittance is relatively high, but in some cases, they take on an undesirable greenish yellow tint.

Moreover, the typical soda-lime glass of the Comparative Example 3 has a dark green color, as can be seen from the fact that the value a* in the L*a*b* color system is −2.31, so that it is not suitable for applications necessitating a light tint.

Then, regarding the creation of NiS in a float furnace, the following experiment was performed.

EXAMPLES 6 to 10

The same basic compositions as in the Examples 1 to 5 were prepared, leading to the compositions listed in Table 3 (expressed in weight percent in terms of the oxides), and the oxide of a heavy element was added and mixed. Zinc nitrate hexahydrate was added only for Zn. Then, 0.028 g Ni powder with an average particle diameter of 149 μm was added per 200 g of this mixture in the molten glass, provided in an alumina crucible with 250 cm$^3$ capacity, which was pre-heated for 30 min at 600° C., and then put into an electric furnace at 1370° C. and heated in 10 min to 1400° C. Then, after keeping it at this temperature for 2.2 hours, the crucible was retrieved from the furnace, its content was cast out, and annealed from 650° C. to room temperature, thus producing the Examples 6 to 10.

In the resulting glass samples, the number of NiS particles in the glass was counted with a stereoscopic microscope, and the number of NiS particles per 100 g of glass was calculated. The result is shown in Table 4.

REFERENCE EXAMPLES 1 TO 5

Samples of the same composition as in the Examples 6 to 10 was prepared, except that no heavy element oxide was added, and as in the Examples 6 to 10, the mixtures were melted, cast out, and annealed, thus producing the Reference Examples 1 to 5. Again, the number of NiS particles per 100 g of glass was calculated; the results are shown in Table 5.

TABLE 3

|  | Ex. 6 | Ex. 7 | Ex. 8 | Ex. 9 | Ex. 10 |
|---|---|---|---|---|---|
| base composition | Ex. 1 | Ex. 2 | Ex. 3 | Ex. 4 | Ex. 5 |
| heavy element oxide | ZnO | ZnO | La$_2$O$_3$ | ZrO$_2$ | WO$_3$ |
| addition amount (ppm) | 200 | 400 | 1000 | 500 | 100 |

TABLE 4

|  | Ex. 6 | Ex. 7 | Ex. 8 | Ex. 9 | Ex. 10 |
|---|---|---|---|---|---|
| number of NiS particles | 9 | 4 | 9 | 11 | 13 |

TABLE 5

|  | Ref. Ex. 1 | Ref. Ex. 2 | Ref. Ex. 3 | Ref. Ex. 4 | Ref. Ex. 5 |
|---|---|---|---|---|---|
| number of NiS particles | 43 | 32 | 23 | 30 | 28 |

From the results in Tables 4 and 5, it can be seen that the generation of NiS particles can be suppressed by addition of the oxides listed in Table 3.

As detailed above, in accordance with the light-colored high-transmittance soda-lime glass of the present invention, it is possible to provide an inexpensive glass having high transmittance and a tint of light blue, neutral gray or bronze.

The light-colored high-transmittance glass of the present invention is particularly suitable as building glass.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light-colored high-transmittance glass sheet containing silica as a main component, wherein
the glass sheet comprises the following coloring components, in weight percent:
less than 0.06% T-$Fe_2O_3$, wherein T-$Fe_2O_3$ is total iron oxide in terms of $Fe_2O_3$;
1.75 to 5 ppm CoO; and
0 to 0.45% cerium oxide;
wherein the ratio of FeO in terms of $Fe_2O_3$ to T-$Fe_2O_3$ is less than 40%; and
wherein the glass sheet has a dominant wavelength of 470 to 495 nm when measured with the CIE Standard illuminant C at a glass sheet thickness of 10 mm.

2. The light-colored high-transmittance glass sheet according to claim 1, characterized in that the glass sheet comprises, in weight percent, at least 0.5 ppm and less than 2 ppm CoO.

3. The light-colored high-transmittance glass sheet according to claim 1, characterized in that the glass sheet comprises, in weight percent, at least 0.02% T—$Fe_2O_3$.

4. The light-colored high-transmittance glass sheet according to claim 1, characterized in that the glass sheet comprises, in weight percent, less than 0.1% cerium oxide.

5. The light-colored high-transmittance glass sheet according to claim 1, characterized in that the glass sheet comprises the following basic glass composition, in weight percent:
65 to 80% $SiO_2$;
0 to 5% $Al_2O_3$;
more than 2% MgO;
5 to 15% CaO;
10 to 18% $Na_2O$;
0 to 5% $K_2O$;
5 to 15% MgO+CaO;
10 to 20% $Na_2O+K_2O$; and
0.05 to 0.25% $SO_3$.

6. The light-colored high-transmittance glass sheet according to claim 5, characterized in that
the glass sheet comprises, in weight percent:
more than 10% MgO+CaO; and
more than 0.1% $SO_3$.

7. The light-colored high-transmittance glass sheet according to claim 1, characterized in that the glass is substantially free of fluorine, barium oxide and strontium oxide.

8. The light-colored high-transmittance glass sheet according to claim 1, characterized in that the glass comprises, in weight percent, 0.001 to 1% heavy element oxide; wherein the heavy element is at least one element selected from the group consisting of Y, La, Zr, Hf, Nb, Ta, W, Zn, Ga, Ge and Sn.

9. The light-colored high-transmittance glass sheet according to claim 8, wherein the glass comprises, in weight percent, 0.01 to 0.1% of the heavy element oxide.

10. The light-colored high-transmittance glass sheet according to claim 9, glass comprises, in weight percent, 0.01 to 0.05% of the heavy element oxide.

11. The light-colored high-transmittance glass sheet according to claim 8, characterized in that the heavy element oxide is ZnO.

12. The light-colored high-transmittance glass sheet according to claim 8, wherein the glass sheet is tempered.

13. A method for manufacturing a light-colored high-transmittance glass sheet, comprising melting raw materials for a glass sheet in accordance with claim 1, the raw materials comprising dolomite and limestone.

14. The method according to claim 13, comprising melting batch material of the raw material in a top-heating tank-type melting furnace.

15. A light-colored high-transmittance glass sheet containing silica as a main component, wherein
the glass sheet comprises the following coloring components, in weight percent:
at least 0.02% and less than 0.06% T-$Fe_2O_3$, wherein T-$Fe_2O_3$ is total iron oxide in terms of $Fe_2O_3$;
0.25 to 3 ppm Se;
0 to 3 ppm CoO; and
0 to 0.45% cerium oxide;
wherein the ratio of FeO in terms of $Fe_2O_3$ to T-$Fe_2O_3$ is less than 40%;
wherein the glass sheet further comprises, in weight percent, more than 2% MgO; and
wherein the glass sheet has a dominant wavelength of 560 to 585 nm when measured with the CIE Standard illuminant C at a glass sheet thickness of 10 mm.

16. The light-colored high-transmittance glass sheet according to claim 15, characterized in that the glass sheet comprises, in weight percent, 0.5 to 2 ppm Se, and 0.5 to 1 ppm CoO.

17. The light-colored high-transmittance glass sheet according to claim 15, characterized in that, at a glass sheet thickness of 10 mm, the chromaticities $a^*$ and $b^*$ in $L^*a^*b^*$ color system measured with the CIE Standard illuminant C are $-1 \leq a^* \leq 0.5$ and $-0.5 < b^* \leq 1.5$.

18. The light-colored high-transmittance glass sheet according to claim 15, wherein the glass sheet comprises, in weight percent, less than 0.1% cerium oxide.

19. The light-colored high-transmittance glass sheet according to claim 15, wherein the glass sheet comprises the following basic glass composition, in weight percent:
65 to 80% $SiO_2$;
0 to 5% $Al_2O_3$;
more than 2% MgO;
5 to 15% CaO;
10 to 18% $Na_2O$;
0 to 5% $K_2O$;
5 to 15% MgO+CaO;
10 to 20% $Na_2O+K_2O$; and
0.05 to 0.25% $SO_3$.

20. The light-colored high-transmittance glass sheet according to claim 19, wherein
the glass sheet comprises, in weight percent:
more than 10% MgO+CaO; and
more than 0.1% $SO_3$.

21. The light-colored high-transmittance glass sheet according to claim 15, wherein the glass is substantially free of fluorine, barium oxide and strontium oxide.

22. The light-colored high-transmittance glass sheet according to claim 15, wherein
the glass comprises, in weight percent, 0.001 to 1% heavy element oxide;

wherein the heavy element is at least one element selected from the group consisting of Y, La, Zr, Hf, Nb, Ta, W, Zn, Ga, Ge and Sn.

23. The light-colored high-transmittance glass sheet according to claim 22, wherein the glass comprises, in weight percent, 0.01 to 0.1% of the heavy element oxide.

24. The light-colored high-transmittance glass sheet according to claim 23, wherein the glass comprises, in weight percent, 0.01 to 0.05% of the heavy element oxide.

25. The light-colored high-transmittance glass sheet according to claim 22, wherein the heavy element oxide is ZnO.

26. The light-colored high-transmittance glass sheet according to claim 22, wherein the glass sheet is tempered.

27. A method for manufacturing a light-colored high-transmittance glass sheet, comprising melting raw materials for a glass sheet in accordance with claim 15, the raw materials comprising dolomite and limestone.

28. The method according to claim 27, comprising melting batch material of the raw material in a top-heating tank-type melting furnace.

* * * * *